Patented Apr. 11, 1944

2,346,409

UNITED STATES PATENT OFFICE 2,346,409

COATING COMPOSITION

Gilbert R. Anderson, Elsmere, Del., assignor to Hercules Powder Company, Wilmington, Del., a corporation of Delaware No Drawing. Application April 22, 1941, Serial No. 389,734

7 Claims. (Cl. 106—227)

This invention relates to coating compositions containing the polypentaerythritol ester of a rosin acid such as fast-bodying, fast-drying pale varnishes prepared with the polypentaerythritol esters of a rosin acid such as rosin or a modified rosin and with either soft-drying oils such as linseed oil or the fast-drying oils such as tung oil.

Heretofore, it has been customary to use tung oil, oiticica oil and other fast-drying oils in the preparation of varnishes. These oils themselves impart good properties to the varnish films and have been customarily used with resins such as ester gum, limed rosin, rosin modified alkyds, and rosin modified phenolics.

The advantages derived from the use of fast-drying oils are due to the properties inherent in the oils themselves. These oils with the old resins and the proper kettling conditions have been capable of polymerizing readily to produce varnishes of any desired viscosity and which upon spreading into a film dried rapidly. The old resins, however, were reaction products of rosin which did not of themselves contribute substantially either to the speed of bodying in the kettle or to the drying of the finished varnish. Accordingly, when it was attempted to produce varnishes by kettling the soft oils such as linseed oil with the older type resins, the resulting varnishes were either slow-drying or low in viscosity or both. This was because soft oils, as distinguished from the fast-drying oils, do not polymerize readily. Moreover, the soft oils do not dry as readily to alkali and water-resistant films.

In U. S. Patent 2,066,759, there is disclosed the use of the pentaerythritol esters of rosin with drying oils such as linseed oil. However, the resulting films do not possess the desirable hardness, water-resistance, and speed of drying.

It is an object of the present invention to make available improved coating compositions.

Another object is to produce improved varnishes with the soft oils such as linseed oil and dehydrated castor oil which are much more plentiful and economical than fast-drying oils such as tung oil, oiticica oil, etc.

Another object is to produce these improved varnishes with either high or low viscosities depending on the use to which the varnish is to be put.

Another object is to produce varnishes that body rapidly and remain colorless upon kettling, that when finished and spread into films will dry rapidly into colorless, hard and flexible films that will not discolor upon baking, or aging or exposure to light or moisture, that will be resistant to alkalies and also to blush in hot or cold water.

Other objects will more fully hereinafter appear.

I have discovered that improved coating compositions may be prepared with polypentaerythritol esters of a rosin acid such dipentaerythritol esters of rosin or a modified rosin.

I have further discovered that varnishes with improved properties can be made with the rosin or modified rosin esters of a polypentaerythritol such as dipentaerythritol and a drying oil. The drying oil may be either a soft oil or a fast-drying oil. These esters with dipentaerythritol because of their high molecular weight and their molecular structure produce with the drying oil and particularly with the soft drying oils, varnishes which body more rapidly in the varnish kettle and which dry more rapidly to harder and more water-resistant films than corresponding varnishes produced with the corresponding rosin or modified rosin ester of pentaerythritol.

As the polypentaerythritol, I prefer to use dipentaerythritol or mixtures of diphentaerythritol and pentaerythritol in which the dipentaerythritol is present in excess of 25% of the mixture. Dipentaerythritol may be considered to be an ether formed by the condensation of two molecules of pentaerythritol and is formed by certain processes of condensing formaldehyde with acetaldehyde. Dipentaerythritol is a hexahydric alcohol, all of the hydroxyl groups being primary. Instead of dipentaerythritol higher polypentaerythritols such as tripentaerythritol, tetrapentaerythritol, etc. may be used. The polypentaerythritol esters of wood rosin, gum rosin, equivalent rosin acids such as abietic acid, pimaric acid, sapinic acid, or modified rosins such as hydrogenated rosin, heat treated rosin, polymerized rosin, "Hyex" rosin (Littmann, 2,130,997), or mixtures of the foregoing resins may be used. The dipentaerythritol is esterified with the rosin acid. The resulting ester should be the complete ester and should have an acid number not above about 25 and a melting point of at least about 120° C. Examples of the production of these resinous esters are given below.

In the production of a cooked varnish in accordance with the present invention, I prefer to use the soft-drying oils such as linseed oil, dehydrated castor oil, perilla oil, soybean oil, fish oils, or any of the soft oils in their fractionated or modified form. These oils may be blown oils, heat bodied oils, alkali refined oils, drying fatty acid esters of polyhydric alcohols other than glycerine such as pentaerythritol, or oils treated in any one of a number of ways to introduce double bonds preferably in conjugated positions. Thus, I may use recently developed substitutes for tung oil which are thought to contain the double bonds in conjugated positions such as dehydrated castor oil. In employing these soft oils, I find it preferable to first heat body them to relatively high viscosities, that is, to a viscosity of at least U on the Gardner-Holdt scale and preferably at least Z on this scale prior to their incorporation with and reaction with the dipentaerythritol resinous ester. This preliminary heat bodying should be carried out at relatively high temperatures, that is, at temperatures of from about 560° F. to about 630° F. However, I may use the raw oils themselves, relying upon the heat of the varnish cooking procedure to impart suitable body and viscosity to these oils.

Instead of using the soft oils, I may use the rapid bodying fast-drying oils such as tung oil, oiticica oil, conjugated double bond linseed oil, etc. These oils either have a high viscosity or acquire a high viscosity very rapidly at the temperatures used in the varnish making process. Therefore, I usually employ these oils in the raw state with the dipentaerythritol resins of the present invention.

In carrying out the varnish making process, I may commingle the raw or bodied oil with the resin at an elevated kettling temperature. In the case of the soft oils which have been pre-bodied, this temperature should range from about 460° F. to about 630° F., whereas when employing the fast bodying oils like tung oil, much lower temperatures must be used such as from about 320° F. to about 570° F.

In making the cooked type of varnish, the resinous dipentaerythritol ester and the drying oil may be commingled in proportions such that between about 5 and about 100 gallons of drying oil are employed per hundred lbs. of the resinous dipentaerythritol ester. These two ingredients are commingled together and maintained at an elevated temperature within the ranges set forth above for a period of time sufficient to effect complete bodying and reaction. Usually, from about 1 to about 4 hours will be found sufficient. Instead of this procedure, I may kettle or body or react a portion of the resin to be employed, say from 10 to 50% of the total amount of resin, with all of the drying oil until the mixture acquires the desired viscosity and then add the remainder of resin and melt it into the mixture thus produced. Other and similar methods of varnish cooking are to be considered to be within the scope of this invention.

Following the reaction of the oil and the resin the mixture is preferably allowed to cool to at least 400° F. whereupon it is thinned with a suitable thinner preferably mineral spirits to a suitable solids content such as to between 25% and 75% of solids. Suitable other components may be added in the preparation of varnishes such as driers, anti-skinning agents, and the like.

Instead of cooking the resin with the oil, I may prepare a varnish by adding a solution of the resin in a suitable volatile organic solvent to the drying oil which may have been previously cooked or blown or by cold cutting the resin and the oil together by means of a suitable mutual volatile organic solvent.

Furthermore, instead of using a drying oil, I may use a drying type alkyd resin. For example, I may cold cut a drying oil fatty acid-modified alkyd resin with the polypentaerythritol resinous ester of the present invention by means of a suitable solvent.

Any desirable additions may be made to the coating compositions of the present invention. Thus, dyes, pigments, other resins, driers, plasticizers, etc. may be added. Under some circumstances a coating composition comprising a simple organic solvent solution of the polypentaerythritol ester of the present invention may be found to serve satisfactorily. Such a composition is of the type known in the art as "spirit varnish."

The following examples will serve to illustrate the preparation of varnishes in accordance with the present invention. However, these examples are not to be construed as limiting.

*Example 1*

One hundred parts of N wood rosin were heated to 200° C. at which point 13.6 parts of di-pentaerythritol was added. This mixture was then heated to 285° C. and held at this temperature for 13 hours. The reaction mixture was protected throughout from contact with air by bubbling a stream of carbon dioxide through the mixture, which also served to carry away the water of reaction and the light fractions of destructively distilled rosin. The resin was then sparged violently with the carbon dioxide for 45 minutes. The resin had a melting point of 129.5° C., an acid number of 9, and a color of 50 amber.

*Example 2*

A raw alkali-refined linseed oil was heat kettled at approximately 575° F. to a viscosity of Z-3 (on the Gardner-Holdt scale).

One hundred pounds of the resin of Example 1 was heated with 25 gallons of the bodied linseed oil at 590° F. for 3 hours and fifteen minutes. The resulting varnish was allowed to cool to 400° F. and thinned to 50% solids with mineral spirits to yield a varnish having a viscosity of J (Gardner-Holdt) and a color of 4 Hellige. The temperature for the production of this particular formulation may vary from 570° F. to 630° F. To produce faster bodying, the oil should be preliminarily bodied to a higher viscosity namely Z-4 to Z-6. To produce low viscosity varnishes, a linseed oil of lower viscosity should be used. In any case, a temperature range of 570° F. to 630° F. is preferable.

*Example 3*

Example 1 was duplicated exactly except that WW gum rosin was substituted for the N wood rosin. The finished resin had an acid number of 16 and a melting point of 145° C.

*Example 4*

A 25-gallon linseed oil varnish was prepared with the resin of Example 3 in the same manner as in Example 2 except that the linseed oil was preliminarily bodied to a Z-5 viscosity and that the varnish was held at 585° F. for only one hour and twenty minutes. Upon reduction to 50% solids with mineral spirits as before there was produced a varnish having a viscosity of F (Gardner-Holdt) and a color of 6 Hellige.

*Example 5*

Example 1 was duplicated exactly except that in place of N wood rosin, there was employed polymerized wood rosin having a melting point of 98–101° C. The finished resin had an acid number of 19 and a melting point of 141° C.

*Example 6*

A 25-gallon linseed oil varnish was prepared with the resin of Example 5 in the same manner as in Example 2 except that the linseed oil was preliminarily bodied to a Z–2 viscosity and a temperature of 585° F. was employed. There was obtained a light colored varnish at 50% solids in mineral spirits, having a viscosity of E (Gardner-Holdt) and a Hellige color of 4L.

*Example 7*

Example 1 was duplicated exactly except that hydrogenated wood rosin having a melting point of 75° C., and an acid number of 161 was used in place of the rosin. The resulting resin had an acid number of 16.5 and a melting point of 121° C.

*Example 8*

A 25-gallon linseed oil varnish was made with the resin of Example 7 in the manner of Example 2.

*Example 9*

To 100 parts of molten N wood rosin was added 13.5 parts of a crude formaldehyde acetaldehyde reaction product comprising 75% pentaerythritol and 25% polypentaerythritol (chiefly dipentaerythritol). The reaction was carried out exactly as in Example 1 except that the time of reaction was 12 hours. The resulting resin had a color of WG, an acid number of 12, and a melting point of 115° C.

*Example 10*

A polymerized rosin was prepared by treating a 35% solution of I wood rosin in benzene with 25% by weight of 95% $H_2SO_4$ at a temperature of 13–18° C. with stirring for one hour, allowing the reaction mixture to stand for 15 minutes, decanting the benzene solution from the acid sludge, washing with water, and evaporating the solvent to recover polymerized rosin having an acid number of 100° C., a color of M, and a melting point of 100° C.

To 100 parts of the above polymerized rosin in molten form was added 13.5 parts of the crude pentaerythritol-dipentaerythritol mixture used in Example 9 and the reaction carried out as in Example 1 to yield a resin having an acid number of 12, a drop melting point of 135° C., and a color of N.

The following are the preferred temperature ranges for use in the kettling of the varnish:

| | Degrees Fahrenheit |
|---|---|
| Tung oil | 320–560 |
| Oiticica oil | 320–560 |
| Perilla oil | 450–580 |
| Dehydrated castor oil | 560–610 |
| Linseed oil | 570–630 |
| Fish oil | 560–600 |
| Soybean oil | 570–630 |

In the foregoing table of temperatures, it will be noted that perilla oil is an exception as a soft oil since bodying temperatures as low as 450° F. are satisfactory with this oil whereas with the other soft oils temperatures in the range of 560 to 630° F. are deemed essential.

From the foregoing, it will be seen that varnishes prepared in accordance with the present invention with a drying oil and with a polyhydric alcohol ester of rosin or modified rosin wherein the polyhydric alcohol comprises at least 25% and preferably essentially dipentaerythritol, exhibit new and improved properties. More importantly, the principles of the invention enable the manufacture of varnishes which are equivalent to prior art varnishes made with tung oil, from the less expensive and more readily available soft oils such as linseed oil which have not heretofore been capable of yielding satisfactory varnishes. Numerous other advantages of the present invention will be apparent to those skilled in the art.

In this specification and in the appended claims, the term "rosin acid" is used to designate either rosin or the acids contained therein or modified rosins. In this specification, the term "modified rosin" is used to denote rosin which has been chemically modified so as to chemically change its rosin nucleus, as by heat treatment, disproportionation, isomerization, hydrogenation, polymerization, etc.

It will be understood that the details and examples hereinbefore set forth are illustrative only and that the invention as broadly described and claimed is in no way limited thereby.

What I claim and desire to protect by Letters Patent is:

1. An oil varnish comprising a rosin acid ester of a member of the group consisting of polypentaerythritols alone and polypentaerythritols in admixture with pentaerythritol with the quantity of polypentaerythritol in excess of 25% of the mixture of pentaerythritol and polypentaerythritols, in which the acid groups of the ester consist of abietic acid groups, and a drying oil.

2. A varnish comprising a bodied and reacted mixture of a rosin acid ester of a member of the group consisting of polypentaerythritols alone and polypentaerythritols in admixture with pentaerythritol with the quantity of polypentaerythritol in excess of 25% of the mixture of pentaerythritol and polypentaerythritols, in which the acid groups consist of rosin acid groups, and a drying oil.

3. A varnish comprising a bodied and reacted mixture of a rosin acid ester of a member of the group consisting of polypentaerythritols alone and polypentaerythritols in admixture with pentaerythritol with the quantity of polypentaerythritol in excess of 25% of the mixture of pentaerythritol and polypentaerythritols, in which the acid groups consist of rosin acid groups, and a soft drying oil which has been preliminarily bodied.

4. A varnish comprising a bodied and reacted mixture of a rosin acid ester in which the alcohol groups consist essentially of dipentaerythritol groups and in which the acid groups consist of rosin acid groups, and a soft drying oil which has been preliminarily bodied to a viscosity of at least U on the Gardner-Holdt scale.

5. A varnish comprising a bodied and reacted mixture consisting principally of a rosin acid ester of a member of the group consisting of polypentaerythritols alone and polypentaerythritols in admixture with pentaerythritol with the quantity of polypentaerythritol in excess of 25% of the mixture of pentaerythritol and polypentaerythritols, in which the acid groups of the ester consist of rosin acid groups, said rosin acid ester having an acid number not above about 25 and a melting point of at least about 120° C., and between about 5 and about 100 gallons per 100 pounds of said ester of a soft drying oil which has been preliminarily bodied to a viscosity of at least U on the Gardner-Holdt scale, the said mixture being dissolved in mineral spirits to a content between about 25% and about 75% of the solution.

6. A varnish comprising a bodied and reacted mixture of a rosin acid ester of a member of the group consisting of polypentaerythritols alone and polypentaerythritols in admixture with pentaerythritol with the quantity of polypentaerythritol in excess of 25% of the mixture of pentaerythritol and polypentaerythritols, in which the acid groups of the ester consist of rosin acid groups, and linseed oil which has been preliminarily bodied to a viscosity of at least U on the Gardner-Holdt scale.

7. A varnish comprising a bodied and reacted mixture of a rosin acid ester of a member of the group consisting of polypentaerythritols alone and polypentaerythritols in admixture with pentaerythritol with the quantity of polypentaerythritol in excess of 25% of the mixture of pentaerythritol and polypentaerythritols, in which the acid groups of the ester consist of rosin acid groups, and dehydrated castor oil which has been preliminarily bodied to a viscosity of at least U on the Gardner-Holdt scale.

GILBERT R. ANDERSON.